United States Patent
Kim et al.

(10) Patent No.: US 6,552,755 B1
(45) Date of Patent: Apr. 22, 2003

(54) METHOD FOR MEASURING CONVERGENCE BY USING A MIXED COLOR PATTERN

(75) Inventors: Wan-Soo Kim, Seoul (KR); Chang-Gun Lee, Suwon (KR)

(73) Assignee: Samsung Electronics Co., LTD, Suwon (KR)

( * ) Notice: Subject to any disclaimer, the term of this patent is extended or adjusted under 35 U.S.C. 154(b) by 484 days.

(21) Appl. No.: 09/625,408

(22) Filed: Jul. 25, 2000

(30) Foreign Application Priority Data

Jan. 29, 2000 (KR) .......................................... 2000-4459

(51) Int. Cl.⁷ ................................................. H04N 9/28
(52) U.S. Cl. .................. 348/807; 348/182; 315/368.11
(58) Field of Search ................................ 348/807, 806, 348/745, 746, 747, 189, 191, 182, 190; 315/368.11, 368.12, 368.24, 368.18; H04N 9/28

(56) References Cited

U.S. PATENT DOCUMENTS 6,483,313 B1 * 11/2002 Kim et al. .................. 348/807

FOREIGN PATENT DOCUMENTS

JP          10-136410       10/1996

* cited by examiner

*Primary Examiner*—Sherrie Hsia
(74) *Attorney, Agent, or Firm*—Larson & Taylor, PLC

(57) ABSTRACT

A method for measuring a convergence of color CRT uses a combination pattern among Red(R), Green(G) and Blue(B) colors on a white pattern when measuring convergence by using a color camera so that convergence is measured with a high degree of precision. The method sequentially generates two test patterns after mixing two colors chosen from among red(R), green(G), and blue(B) colors, e.g., mixtures of red(R)/blue(B) and green(G)/blue(B). Images are independently obtained of the two test patterns formed on the color CRT screen, and a signal conversion is performed based on each independently obtained pattern image to produce image information. The image information is stored and a convergence of the stored image information for each test pattern is calculated.

5 Claims, 5 Drawing Sheets (a) R pattern  (b) G pattern  (c) B pattern (a) RB(Margenta) pattern  (b) GB(Cyan) pattern

METHOD FOR MEASURING CONVERGENCE BY USING A MIXED COLOR PATTERN

BACKGROUND OF THE INVENTION

(1) Field of the Invention

The present invention relates to a method for measuring the convergence of a color cathode ray tube (CRT). More particularly, the invention relates to a method for measuring with a high degree of precision the convergence of a color CRT which uses a combination pattern of Red(R), Green(G), and Blue(B) colors on a white pattern when measuring convergence by using a color camera.

(2) Description of the Related Art

In general, in order to display in perfect color the displayed image in the manufacturing process of a color CRT to be used as a display device (e.g., a color TV or a color monitor), three electron beams, i.e., three color (Red, Green, and Blue) electron beams (hereinafter referred to as R.G.B beams) are generated from three electron guns. The beams are ideally concentrated on one pixel point of a CRT screen, each with a different incidence angle. The operation that provides this concentration of the three electron beams is referred to as convergence alignment.

There are two kinds of convergences, a static convergence and a dynamic convergence. The static convergence prevents misconvergence by adjusting the concentration of the R.G.B beams in the vicinity of a center portion of the screen, while dynamic convergence adjusts the concentration of R.G.B beams in the vicinity of a peripheral part of screen.

In a conventional color CRT, a horizontal deviation magnetic field is derived from a deviation yoke mounted between three electron guns, and the screen ideally provides strong pincushion-type magnetic field, while a vertical deviation magnetic field ideally comprises a strong barrel-type magnetic field. Each progression direction of the three (R.G.B) beams is varied by the horizontal and vertical magnetic fields, so that the three(R.G.B) beams are concentrated on a screen.

In order to measure the convergence of color onto the CRT, the prior art provides for scattering of many white patterns with a mixed color selected among Red, Green, and Blue on a color CRT. A color camera picks up the images and divides Red(R), Green(G), and Blue(B) colors from the picked-up image, measures relative distances between Red (R), Green(G), and Blue(B) signals, and calculates convergence.

However, this convergence measuring method using a white pattern cannot reproduce pure Red(R), Green(G), and Blue(B) colors, without any mixed colors, by using the fluorescent material of a standard color CRT. Accordingly, if the color is derived from the image being picked up by a color camera, a mixed color among R.G.B. colors results, as shown in FIG. 1 (i.e., a mixture of Red and Green or a mixture of. Green and Blue). Such a mixed color decreases the precision of convergence measurement.

Accordingly, in order to prevent deterioration in the degree of precision of the signal convergence measurement resulting from the mixed color among R.G.B. colors, the circular R.G.B. patterns shown in FIG. 2 are sequentially displayed in a virtual cross-hatch pattern on the screen of the color CRT, and a camera picks up each of the R.G.B. patterns three times, thereby obtaining a convergence. However, this conventional technique individually picks up each color pattern of R.G.B. patterns, thereby requiring the pick-up operations to be repeated three times. As a result, convergence measuring time is relatively prolonged, and errors due to time differences between image transfers cases occurs because a weight center point is inferred from several different images picked up at different times.

In addition, when displaying a red(R) color pattern, a green(G) color pattern, and a blue(B) color pattern, respectively, it is difficult to accurately position these patterns on a crossing point of a virtual cross-hatch pattern because these patterns have a round shape. As a result, convergence measurement errors occur.

SUMMARY OF THE INVENTION

Accordingly, the present invention is directed to an improved method for measuring color signal convergence of color signals of a color CRT. The method is as follows. Two color signals selected from among red(R), green(G), and blue(B) signals are mixed. Two test patterns based on the two color signals on a color CRT screen are generated in sequence. Images of the two test patterns formed on the screen are independently obtained. A signal from each independently obtaining pattern image is converted into image information, and the image information is stored. Finally, a convergence of the image information for each stored test pattern is calculated.

Preferably, the two test patterns are a mixed color pattern of red(R)/blue(B), and a mixed color pattern of green(R)/blue(B). The test pattern contacts a cross point of a cross-hatch pattern, the pattern is positioned to remain unseparated from the cross-hatch pattern, and the pattern is of a triangular shape.

BRIEF DESCRIPTION OF THE DRAWINGS

Further objects and other advantages of the present invention will become apparent from the following description in conjunction with the attached drawings.

DETAILED DESCRIPTION OF THE PREFERRED EMBODIMENTS

The preferred embodiment of the present invention will now be described in detail with reference to the accompanying drawings.

Figure 1:
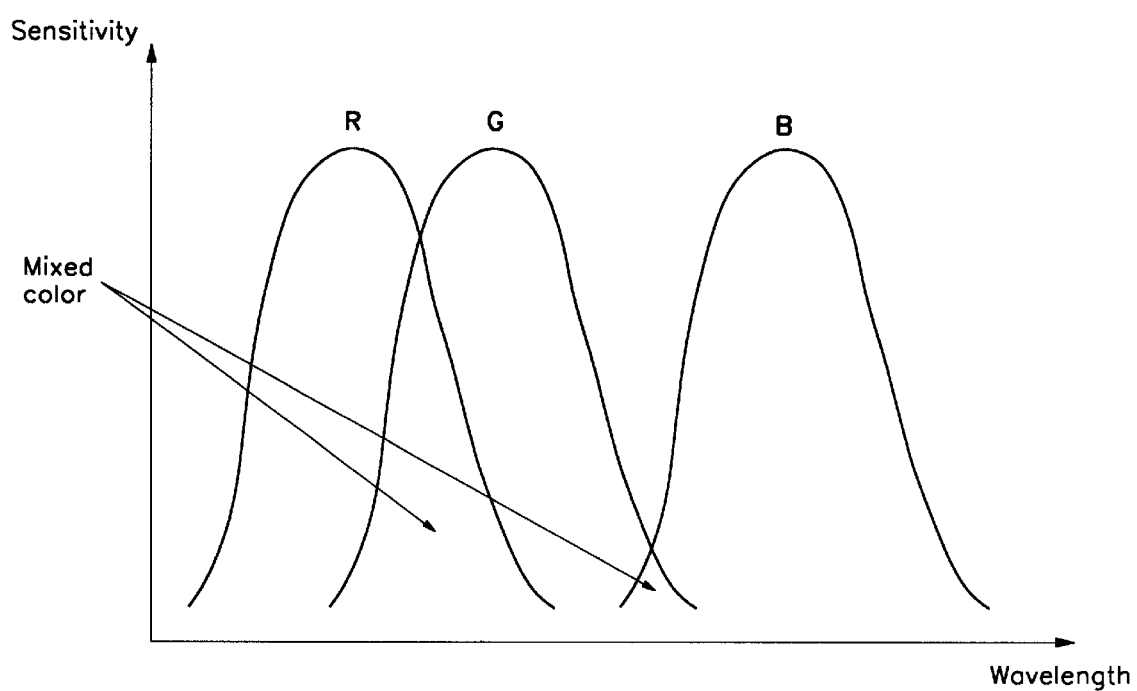
FIG. 1 shows a graph of sensitivity versus wave length showing the generation of mixed colors from red(R), green (G), blue(B) color signals.
Figure 2:
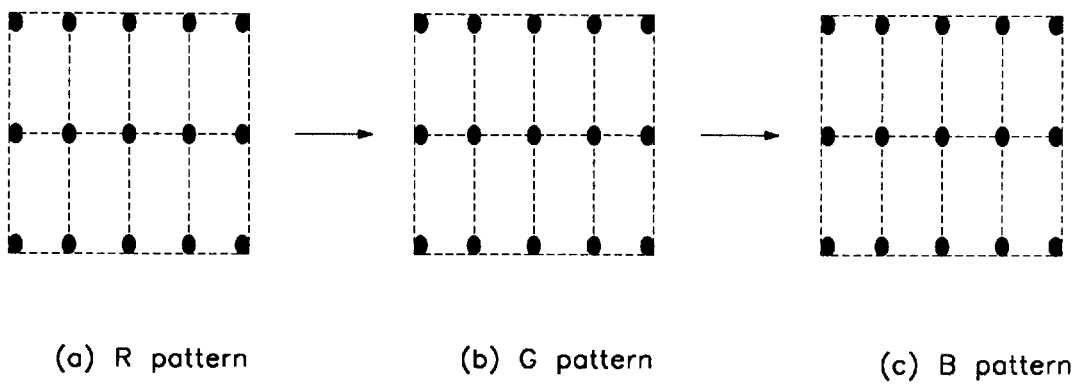
FIG. 2 shows a red(R) color circular pattern, a green(G) color circular pattern; and a blue(B) color circular pattern producing using conventional prior art techniques.
Figure 3:
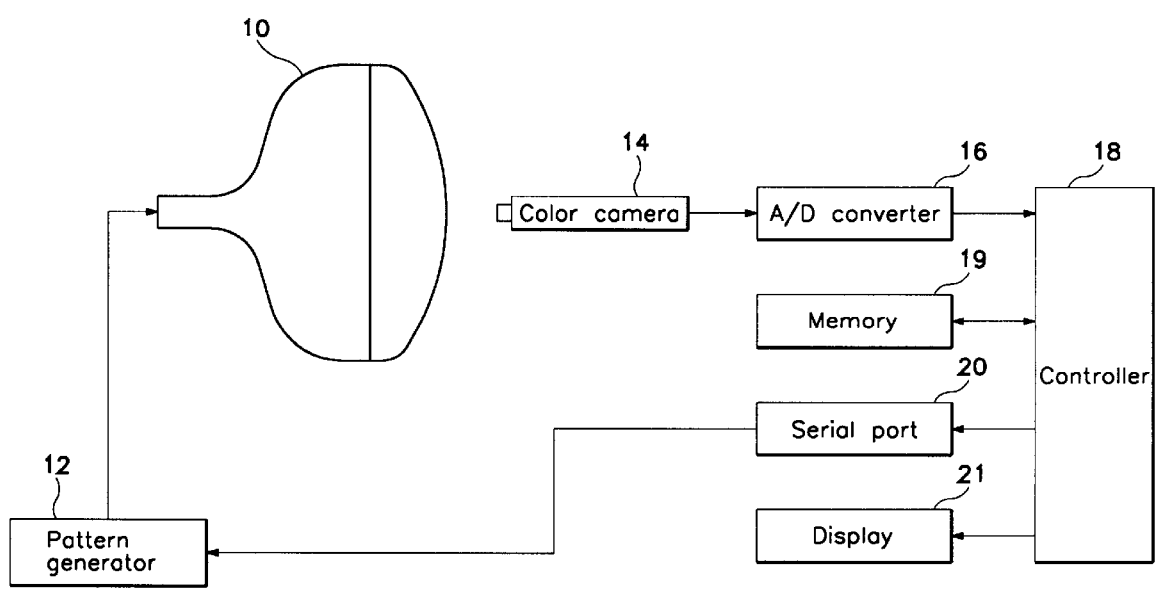
FIG. 3 is a block diagram of a convergence measurement system of a color CRT in accordance with the present invention.

As indicated above, FIG. 3 shows a convergence measurement system for a color CRT in accordance with a preferred embodiment of the present invention. As shown in FIG. 3, in a convergence measurement system for a color CRT, an output terminal of a pattern generator 12 used to generate an image pattern is connected to a color CRT 10.

An input terminal of the pattern generator 12 is electrically connected to a controller 18 through a serial port 20.

The controller 18 inputs a control signal corresponding to an test pattern of a specific color to the pattern generator 12 through the serial port 20. The pattern generator 12 receives the control signal, and generates a test pattern of a corresponding color on the screen of the color CRT 10. A color camera 14 picks up the test pattern on a screen of the color CRT 10. An analog image signal produced by the color camera 14 is transmitted to an A/D converter 16, is converted to a digital video signal, and is then input to the controller 18.

The controller 18 stores the input digital video signal in a memory 19. Also stored in memory 19 are red (R) color data, green(G) color data, and blue(B) color data to be separated from each other. The controller 18 calculates a weight center for each of the R.G.B colors, calculates a convergence, and displays the convergence on a display unit 21.

Figure 4:
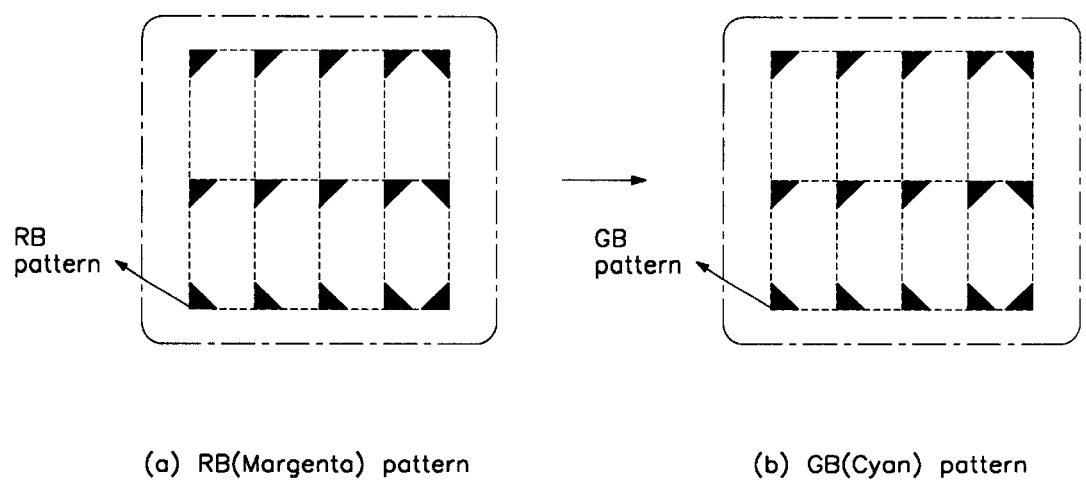
FIGS. 4A and 4B shows mixed color patterns of red(R)/blue(B) and green(G)/blue(B) used in the convergence measurement system of FIG. 3.

Considering an example in connection with the convergence measuring system described above, it is assumed that the test pattern of a specific color to be displayed on the screen of a color CRT 10 is a Magenta pattern of red(R)/blue(B) shown in FIG. 4A, and a Cyan pattern of green(G)/blue(B) shown in FIG. 4B. These Magenta and Cyan patterns are provided on the basis of a blue(B) color line.

To provide these colors, the controller 18 loads the Magenta pattern of red(R)/blue(B) on the screen of the color CRT 10 and calculates a convergence between the red(R) and blue(B) colors. The controller 19 next loads the Cyan pattern of green(G)/blue(B) on a screen of the color CRT 10 and repeats the process.

As shown in FIGS. 4A and 4B, the mixed color pattern (Magenta) of red(R)/blue(B) and the mixed color pattern (Cyan) of green(G)/blue(B) are each a triangular pattern. These triangular patterns are positioned so as not to be separated from, i.e., in contact with, the corresponding cross-hatch pattern area, and also contact a crossing point of the cross-hatch pattern. Further, the Cyan pattern of green(G)/blue(B) is picked up after the Magenta pattern of red(R)/blue(B). The Cyan pattern is picked up first because the red(R) color is positioned farther away than the blue(B) color from the green(G) color making it desirable for a convergence measurement of red(R) to be performed first.

A method for measuring convergence using the mixed color patterns of red(R)/blue(B) and green(G)/blue(B) will now be described with reference to FIG. 5.

Figure 5:
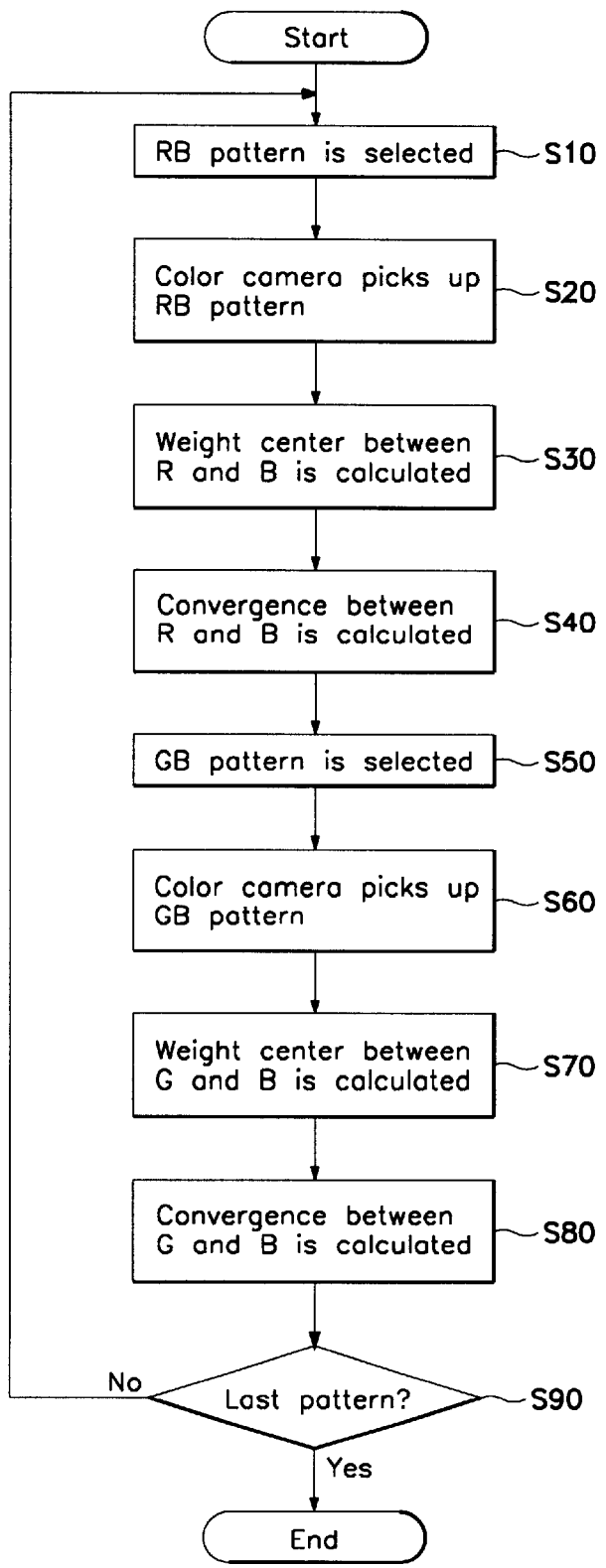
FIG. 5 is a flow chart of the principal steps of a method for measuring a convergence of a color CRT using the mixed color patterns of FIG. 4.

With Reference to FIG. 5, in order to control the convergence of the color CRT 10 of FIG. 3, convergence to be controlled is shown, the controller 18 selects (as indicated by block S10) a mixed color pattern(Magenta) of red(R)/blue(B), and inputs a corresponding control signal to the pattern generator 12 via the serial port 20. The pattern generator 12 receives the control signal, produces an electrical signal corresponding to the control signal, and inputs the signal to the color CRT 10. Electrons are generated by two electron guns, a red(R) color gun and blue(B) color gun, of the three electron guns(i.e., the R, G, and B guns) of the color CRT 10. These electrons collide with the screen surface of the color CRT 10, thereby producing an image. Accordingly, a triangular pattern of red(R)/blue(B) as shown in FIG. 4A is displayed on the color CRT 10. At this stage, the pattern is in contact with a crossing point of the cross-hatch pattern, and is positioned so as not to be separated from the cross-hatch pattern area, as shown in FIG. 4A, and the pattern is displayed on the screen of the color CRT 10. The color camera 14 picks up (block S20) this triangular mixed color pattern of red(R)/blue(B) formed on the screen of the color CRT 10.

The video signal generated from the color camera 14 is converted to a digital video signal by the A/D converter 16, and is input to the controller 18. The input digital video signal is divided into a red(R) color and a blue(B) color, and is stored in a memory red(R) region and a blue(B) memory region of the memory 19. The controller 18 calculates the center position of each of the red(R) and blue(B) colors stored in the memory 19 in order to calculate the convergence between the colors. An area of a predetermined size about each center position is determined. A weight center is estimated (block S30) for red(R) and blue(B) colors positioned in the area. Next, the relative distance between two centers is calculated, a convergence between red(R) color and blue(B) color is calculated (block S40) and the convergence is displayed on a display unit 21.

After performing the last calculating step (block S40), the controller 18 selects (block S50) a Cyan pattern of green(G)/blue(B), and inputs a corresponding control signal into the pattern generator 12 via a serial port 20. The pattern generator 12 receives the control signal, generates an electrical signal corresponding to the control signal, and inputs the signal to the color CRT 10. Electrons are generated from the two electron guns of green(G) and blue(B) of the three electron guns of the CRT 10. The electrons collide with the surface of the CRT screen, thereby creating an image. As a result, the triangular Cyan pattern of green(G)/blue(B) shown in FIG. 4B is displayed by the CRT 10. The color camera 14 picks up (block S60) the triangular Cyan pattern of green(G)/blue(B).

The video signal generated by the color camera 14 is converted to a digital video signal by the A/D converter 16, and is then input to the controller 18. The input digital video signal is divided into green(G) color and blue(B) color. Each divided color is stored in a green(G) memory region and a blue(B) memory, respectively. The controller 18 obtains the center position for each of the of green(G) and blue(B) colors in order, to calculate a convergence, determines and sets an area of a predetermined size about each center position, and estimates (block S70) a weight center for the green(G) and blue(B) colors positioned in this area. Convergence is calculated (S80) by calculating the relative distance between two weight centers, and is displayed on the display part 21.

The aforementioned steps S10–S80 are performed for all patterns displayed on the CRT screen and are performed (as indicated by decision diamond S90) until the last pattern has been sent and processed and the corresponding convergence has been calculated, thus completing the program.

As described above, the method of the invention uses a combination pattern(i.e., Magenta and Cyan patterns) among Red(R).Green(G).Blue(B) colors of a white pattern when measuring convergence using a color camera, and thus measures convergence with a high degree of precision. Specifically, since a Magenta pattern of red(R)/blue(B) and a Cyan pattern of green(G)/blue(B) are used, an imaging operation is performed only twice, instead of three times as called for in the prior art. This reduces photographing time as compared with the prior art method of sequentially photographing three color patterns (R.G.B.), thereby increasing productivity.

Although the invention has been described above in relation to a preferred embodiment thereof, it will be understood by those skilled in the art that variations and modifications can be effected without departing from the scope and spirit of the invention.

What is claimed is:

1. A method for measuring color signal convergence of color signals of a color CRT, said method comprising the steps of:
   a) mixing two color signals selected from among red(R), green(G), and blue(B) signals;
   b) sequentially generating two test patterns based on said two color signals on a color CRT screen;
   c) independently obtaining images of said two test patterns formed on said screen;
   d) converting a signal from each independently obtaining pattern image into image information, and storing said image information; and
   e) calculating a convergence of the image information for each stored test pattern.

2. A method according to claim 1, wherein the two test patterns are a mixed color pattern of red(R)/blue(B), and a mixed color pattern of green(R)/blue(B).

3. A method according to claim 1, wherein the test pattern contacts a cross point of a cross-hatch pattern, the test pattern is positioned to remain unseparated from the cross-hatch pattern, and the test pattern is of a triangular shape.

4. A method for measuring convergence of color signals of a color CRT, said methods comprising the steps of:
   generating a mixed color pattern of red(R)/blue(B) colors on a color CRT screen;
   obtaining an image of said mixed color pattern of red(R)/blue(B) colors,
   performing a signal conversion based on said image of the mixed color pattern of red(R)/blue(B) colors to produce image information,
   storing said image information,
   calculating a convergence between said red(R) and blue (B) colors;
   generating a mixed color pattern of green(G)/blue(B) colors on said color CRT screen;
   obtaining an image of the mixed color pattern of green (G)/blue(B) colors;
   performing a signal conversion based on said image of the mixed color pattern of green(G)/blue(B) color to produce image information,
   storing said image information, and
   calculating a convergence between said green(G) and blue(B) colors.

5. A method according to claim 4, wherein the mixed color pattern of red(R)/blue(B) and the mixed color pattern of green(G)/blue(B) contact a crossing point of a cross-hatch pattern, the mixed color pattern is positioned to remain unseparated from the cross-hatch pattern, and the mixed color pattern is of a triangular shape.

* * * * *